(12) United States Patent
Brensinger

(10) Patent No.: US 10,926,484 B2
(45) Date of Patent: Feb. 23, 2021

(54) SEAM FORMING SYSTEM AND METHOD

(71) Applicant: Nemo Equipment, Inc., Dover, NH (US)

(72) Inventor: Camon Brensinger, Stratham, NH (US)

(73) Assignee: NEMO Equipment, Inc., Dover, NH (US)

( * ) Notice: Subject to any disclaimer, the term of this patent is extended or adjusted under 35 U.S.C. 154(b) by 186 days.

(21) Appl. No.: 16/278,943

(22) Filed: Feb. 19, 2019

(65) Prior Publication Data

US 2019/0224922 A1   Jul. 25, 2019

Related U.S. Application Data

(63) Continuation-in-part of application No. 15/463,550, filed on Mar. 20, 2017, now abandoned.

(51) Int. Cl.
| | |
|---|---|
| *B29C 65/00* | (2006.01) |
| *B29C 65/78* | (2006.01) |
| *B29C 65/02* | (2006.01) |
| *B29D 22/02* | (2006.01) |
| *B29C 65/18* | (2006.01) |

(Continued)

(52) U.S. Cl.
CPC ............ *B29C 66/004* (2013.01); *B29C 65/02* (2013.01); *B29C 65/18* (2013.01); *B29C 65/4815* (2013.01); *B29C 65/5042* (2013.01); *B29C 65/7802* (2013.01); *B29C 66/0042* (2013.01); *B29C 66/1122* (2013.01); *B29C 66/432* (2013.01); *B29C 66/439* (2013.01); *B29C 66/4322* (2013.01); *B29C 66/49* (2013.01); *B29C 66/73921* (2013.01); *B29C 66/81463* (2013.01); *B29C 66/8432* (2013.01); *B29D 22/02* (2013.01); *B29C 65/04* (2013.01); *B29C 65/08* (2013.01); *B29C 65/48* (2013.01); *B29C 66/1142* (2013.01); *B29C 66/71* (2013.01); *B29C 66/723* (2013.01);

(Continued)

(58) Field of Classification Search
CPC ..... B29C 66/71; B29C 66/1122; B29C 65/02; B29C 65/04; B29C 66/004; B29C 66/43; B29C 66/438; B29C 66/439; B29C 66/729; B29C 66/7392; B29C 66/8322; B29D 22/02; B32B 5/26; B32B 7/04
See application file for complete search history.

(56) References Cited

U.S. PATENT DOCUMENTS

| | | | | |
|---|---|---|---|---|
| 5,419,726 A | * | 5/1995 | Switlik | ................... B63B 35/58 441/40 |
| 2017/0266875 A1 | * | 9/2017 | Brensinger | ............. B29C 65/08 |

\* cited by examiner

*Primary Examiner* — Jacob T Minskey
*Assistant Examiner* — S. Behrooz Ghorishi
(74) *Attorney, Agent, or Firm* — Bourque & Associates

(57) ABSTRACT

A system and method for forming a seam between at least first and possibly second pieces of material used to form an inflatable product utilizes at least a first and potentially a second seam forming members that are attached to an inside wall of a piece of product material that comprises the inflatable product proximate each end. The inflatable product is comprised of one or more pieces of product material and one or more seam forming members located at any location where a seam is necessary. A first portion of the seam forming member attaches to a first edge of a first piece of product material and a second portion of the seam forming member attaches proximate a second edge of the first piece of product material. The seal forming can be accomplished by radio frequency, ultrasonic, heat or other types of welding, and adhesive or chemical based bonding.

6 Claims, 2 Drawing Sheets

(51) Int. Cl.
  *B29C 65/48* (2006.01)
  *B29C 65/50* (2006.01)
  *B29C 65/04* (2006.01)
  *B29C 65/08* (2006.01)
  *B29L 22/02* (2006.01)
(52) U.S. Cl.
  CPC .... *B29C 66/73941* (2013.01); *B29C 66/8122* (2013.01); *B29L 2022/02* (2013.01)

US 10,926,484 B2

SEAM FORMING SYSTEM AND METHOD

CROSS-REFERENCE TO RELATED APPLICATIONS

This application is a continuation-in-part of U.S. patent application Ser. No. 15/463,550 Filed Mar. 20, 2017 entitled "SEAM FORMING SYSTEM AND PRODUCTION METHOD" which in turn claims priority from U.S. Provisional patent application Ser. No. 15/463,550, titled "Seam Forming System and Method", which was filed on Mar. 20, 2017, both of which are incorporated fully herein by reference.

TECHNICAL FIELD

The present invention relates to a seam forming system and method for welding, gluing or otherwise joining two pieces together and more particularly, relates to a high-strength sheer-type seam method that can be used with heat weldable materials or adhesives used in the manufacture of various products including inflatable products.

BACKGROUND INFORMATION

Inflatable products such a tubes, etc. are typically made from low cost plastic or PVC type material that is generally heat weldable or sealable. This facilitates a high volume, low cost production method. Typically, the design of such products requires at least one seam. These seams are exposed to extreme internal and external pressure and stress once they are inflated and have been the source of air leaks, complete failure and other damage to inflatable products. Repairing a damaged seam is often difficult or impossible and repaired seams generally do not hold up as long as original seams. Accordingly, what is needed is a new method of welding a seam that resists separation and that has high burst strength.

SUMMARY OF THE INVENTION

The invention features, in one embodiment, a seam forming system, for use in joining first and second edge regions of at least a first piece of product material. The seam forming system comprises at least a first planar seam forming member having a first side and a second side and a first end and a second end. A portion of the first side of the at least a first planar seam forming member proximate the first end is configured for forming a seam joint between the portion of the first side proximate the first end of the at least a first planar seam forming member and a first edge region of the at least a first product material. A portion of the first side of the at least a first planar seam forming member proximate the second end is configured for forming a seam joint between the portion of the first side of the at least a first planar seam forming member proximate the second end of the at least a first planar seam forming member and a second edge region of the at least a first product material.

The seam forming system may further include a second piece of product material and a second planar seam forming member. The second planar seam forming member has a first side and a second side and a first end and a second end. A portion of the first side of the second planar seam forming member proximate the first end is configured for forming a seam joint between the portion of the first side proximate the first end of the second planar seam forming member and a first edge region of the second piece of product material, while a portion of the first side of the second planar seam forming member proximate the second end is configured for forming a seam joint between the portion of the first side of the second planar seam forming member proximate the second end of the second planar seam forming member and a second edge region of the second piece of product material.

The seam joint between the portion of the first side proximate the first end of the at least a first planar seam forming member and a first edge region of the at least a first product material and the seam joint between the portion of the first side of the at least a first planar seam forming member proximate the second end of the at least a first planar seam forming member and a second edge region of the at least a first product material and between the portion of the first side proximate the first end of the second planar seam forming member and a first edge region of the second product material and the seam joint between the portion of the first side of the second planar seam forming member proximate the second end of the second planar seam forming member and a second edge region of the second product material are formed from a method selected from the group of seal forming methods consisting of radio frequency, ultrasonic, heat or other types of welding, and adhesive or chemical based bonding.

The invention also features a seam joining method for use in joining a first edge and a second edge of material to be joined together. The seam joining method comprises the acts of providing at least a first planar seam forming member having a first side and a second side and a first end and a second end. A portion of The first side of the at least a first planar seam forming member proximate the first end is configured for forming a seam joint between said portion of the first side proximate the first end of the at least a first planar seam forming member and a first edge region of the at least a first product material. A portion of the first side of the at least a first planar seam forming member proximate the second end is configured for forming a seam joint between the portion of the first side of the at least a first planar seam forming member proximate the second end of the at least a first planar seam forming member and a second edge region of the at least a first product material.

The method includes joining the first end of the at least a first planar seam forming member to the first edge region of the at least a first product material and joining the second end of the at least a first planar seam forming member to the second edge region of the at least a first product material.

The seam joining method includes the act of joining the seam joining element to the first and second end of the at least a first product member by means of heat welding, ultrasonic welding or utilizing an adhesive.

The seam joining method further includes the act of providing a second piece of product material and a second planar seam forming member. The second planar seam forming member has a first side and a second side and a first end and a second end. A portion of the first side of the second planar seam forming member proximate the first end is configured for forming a seam joint between the portion of the first side proximate the first end of the second planar seam forming member and a first edge region of the second piece of product material while a portion of the first side of the second planar seam forming member proximate the second end is configured for forming a seam joint between the portion of the first side of the second planar seam forming member proximate the second end of the second planar seam forming member and a second edge region of the second piece of product material.

The method further includes joining the first end of the second planar seam forming member to the first edge of the second edge region of the second piece of product material and joining the second end of the second planar seam forming member to the second edge of the second piece of product material.

The present invention features in another embodiment a seam forming method for use in joining a first edge and a second edge of material to be joined together. The seam joining method comprises the acts of providing a first generally planar inflatable product member having a first side and a second side and a first end and a second end and also providing a second generally planar inflatable product member having a first side and a second side and a first end and a second end.

The method includes providing a first weld member having a first end and a second end and a second weld member having a first end and a second end.

At least a portion of the first side of the first generally planar inflatable product member proximate the first end is configured for forming a seam joint between the at least a portion of the first side proximate the first end of the at least a first generally planar inflatable product member and a first end of the first weld member, and wherein at least a portion of the first side of the first generally planar inflatable product member proximate the second end is configured for forming a seam joint between the at least a portion of the first side of the first generally planar inflatable product member proximate the second end of the first generally planar inflatable product member and a first end of the second weld member.

At least a portion of the first side of the second generally planar inflatable product member proximate the first end is configured for forming a seam joint between the at least a portion of the first side proximate the first end of the second generally planar inflatable product member and a second end of the first weld member, and wherein at least a portion of the first side of the second generally planar inflatable product member proximate the second end is configured for forming a seam joint between the at least a portion of the first side of the second generally planar inflatable product member proximate the second end and the second end of the second weld member.

The method further includes providing a temporary heat sealing insulation member disposed between the first and second ends of the first weld member and the first and second ends of the second weld member and providing a heat sealing apparatus configured for providing heat and pressure against the second side of the first generally planar inflatable product member and proximate the first and second ends of the first generally planar inflatable product member.

Utilizing the heat sealing apparatus, the method includes simultaneously providing heat and pressure against the second side of the first and second generally planar inflatable product members proximate their first and second ends, such that the heat sealing apparatus is configured for: sealing the first end of the first generally planar inflatable product member to the first end of the first weld member; sealing the second end of the first generally planar inflatable product member to the first end of the second weld member; sealing the first end of the second generally planar inflatable product member to the second end of the first weld member; and sealing the second end of the second generally planar inflatable product member to the second end of the second weld member. Finally, the method includes the act of removing the temporary heat sealing insulation member.

In one embodiment, the first and second generally planar inflatable product members and the first and second weld members are made from a thermoplastic material. Further, in another embodiment, the first and second weld members may be injection molded from a thermoplastic material.

The temporary heat sealing insulator may be made of a metal, such a brass, coated with a nonstick layer such as Teflon®.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1A:
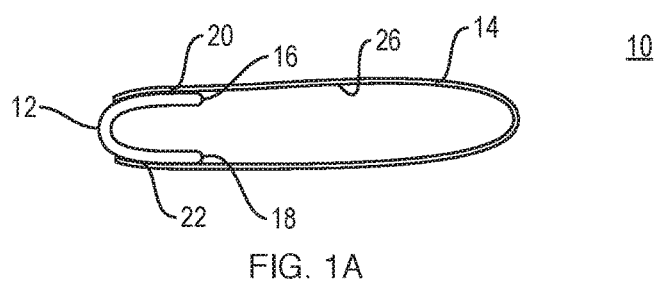
FIG. 1A is a detailed view of the seam method according to the present invention prior to inflation.

In the preferred embodiment of the present invention, FIGS. 1A-1D, an improved seam forming method and a seam forming element is shown for an inflatable product 10 that comprises a seam forming element 12, which is configured to attach to an inside wall 26 of at least one piece of inflatable product material 14 that comprises the inflatable product 10. The inflatable product material 14 is preferably a thermoplastic type of material suitable for heat sealing. The seam forming element 12 is flexible and preferably of the same or similar material as the inflatable product material 14 that comprises the inflatable product 10 and most preferably, comprises an injection molded or extruded thermoplastic component which allows it to be heat sealed to the inflatable product material 14. The "C" shape of the extruded seam forming elements 12 allow it/them to be inserted over the heat sealing insulator 30 described below and shown in FIG. 1D and preferably the entire assembly comprising heat sealing insulator 30 and seam forming elements 12a and 12b are placed together between one or more sheets of inflatable product material 14 as the first step in the assembly process in the case of a heat sealing assembly method.

The seam forming element 12 includes a first end 16 for heat sealing or welding to a first portion 20 of the inflatable product material 14 and a second end 18 for attachment to a second portion 22 of the inflatable product material 14. The inflatable product material 14 can be any flexible plastic or laminate material, such as what is typically used for inflatable products and most preferably a thermoplastic or thermo-reactive material.

The first portion 20 of the inflatable product material attaches proximate an attachment area 24 to the first end 16 of the seam forming element 12 by way of any suitable seal forming method including but not limited to radio frequency, ultrasonic, heat and/or other types of welding, and adhesive or chemical based bonding, while the second portion 22 of the inflatable product material attaches at an attachment area 25 to the second end 18 of the weld member 12 also by way of any suitable seal forming method as set forth above. Other methods of attaching the two materials together are contemplated and within the scope of the invention. The attachment areas 24, 25 preferably cover the entire portion of the contact area between the weld member 12 and the inflatable product material ends 20, 22.

Figure 1B:
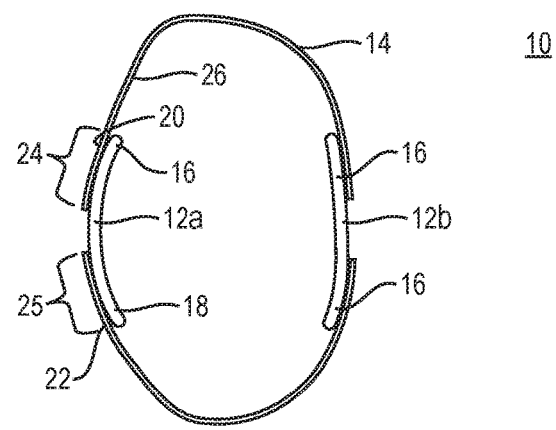
FIG. 1B is a detailed view of the weld method after inflation.
Figure 1C:
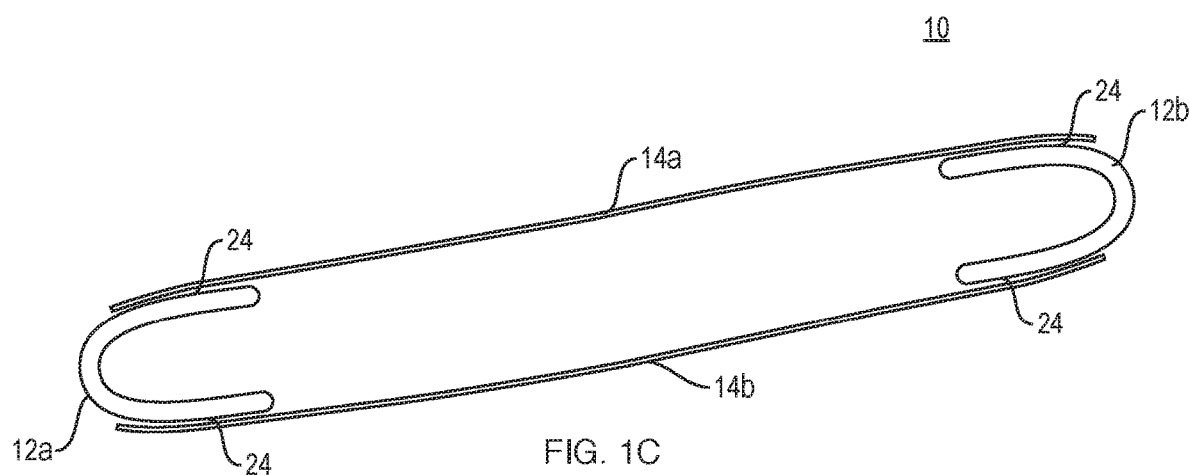
FIG. 1C is a detailed view of two weld members as contemplated by of one embodiment of the present invention.
Figure 1D:
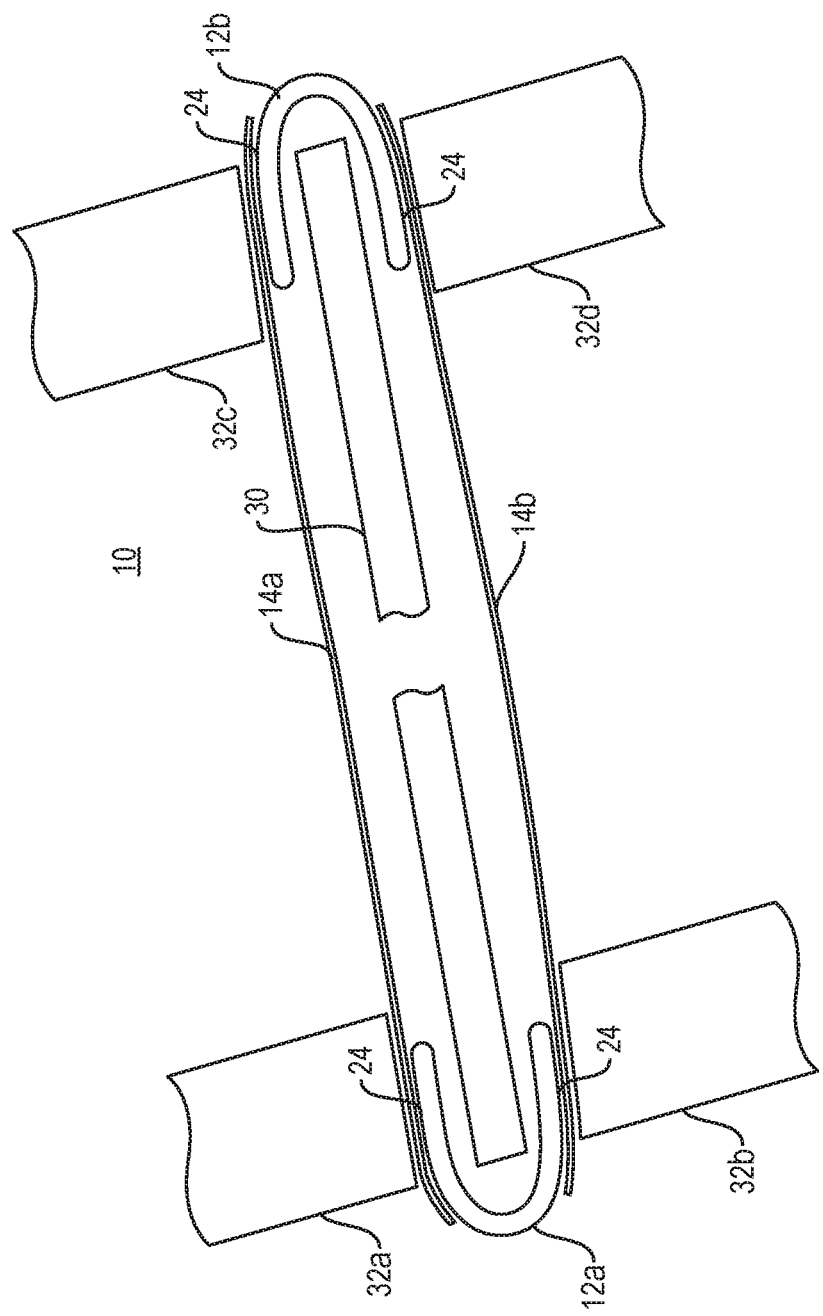
FIG. 1D is a detailed view of a temporary heat sealing insulator in place in the inflatable product with the heat sealing apparatus in place ready to be utilized as contemplated by of one embodiment of the present invention.

In order to achieve the desired bond between the weld members 12a and 12b and the inflatable product material 14a and 14b without allowing the weld members 12a and 12b to become welded to themselves, one or more temporary heat sealing insulator(s) 30 preferably comprising a brass or other similar element covered in a non-stick material such as Teflon® is assembled in the center of the inflatable beam 10 as shown in FIG. 1D. The one or more temporary heat sealing insulator(s) 30 may comprise one piece spanning from side to side and the entire length of the inflatable beam 10 or alternatively, may comprise two temporary heat sealing insulator(s) 30 one for each side of the inflatable beam 10 or may be provided in two lengths to facilitate handling or perhaps to facilitate bends or curves in the inflatable beam. All such variations are considered within the scope of the invention.

Next, heating elements such as heated elements 32a-32d configured to be brought towards each other under pressure are utilized in pairs (32a and 32b) and (32c and 32d) to heat seal the weld members 12 to inflatable product material 14 in the area 24 as is well known in the art of heat sealing techniques.

Heat sealing is the process of sealing one thermoplastic to another similar thermoplastic using heat and pressure. The direct contact method of heat sealing as described herein as one example of sealing utilizes one or more constantly heated dies or a sealing bar 32 to apply heat and pressure to a specific contact area 24 or path to seal or weld the thermoplastics 12, 14 together. The temporary heat sealing insulator 30 is then removed and the assembly of the ends of the inflatable product 10 (not shown) to form a "tube" is completed by also heat or other welding or seam forming method.

As shown in FIG. 1A, when the inflatable product 10 is deflated, the seam forming element 12 can lay flat or form a "C" shape. In this deflated condition, the seam forming element 12 and the end regions 20, 22 of the inflatable member 10 are in a "peel" attachment state meaning the ends of the attachment material/regions 20, 22 could be relatively easily "peeled" off or away from the seam forming element 12.

However, once the inflatable product 10 is inflated, FIG. 1B, the seam forming element 12 conforms to the desired shape of the inflatable product 10. The seam is such that the air pressure on the inside of the inflatable product places the seam formed by the seam forming element 12 and the end regions 20, 22 of the inflatable member 10 in "sheer", creating a seam that cannot easily be torn apart or separated, and is much more resistant to seam delamination and failure than a traditional "peel" type seam arrangement. The seam forming method of the present invention is superior over seam forming methods currently used with inflatable products.

It is contemplated by this invention that one or more seam forming elements 12 could be used at the same time. For example, two seam forming elements 12a, 12b may be utilized. In this example, FIG. 1C, two pieces of inflatable product material 14a, 14b, are used. The attachment means and methods utilized with two or more weld members are the same as described above for FIGS. 1A and 1B.

The invention describes a method of seaming inflatable products in order to utilize a simple welding/heat sealing production method that is low cost, but creates a high strength sheer-type seam when the final product is inflated. The seam forming method allows for the affordable manufacturing of very lightweight inflatable products that can be composed of laminate fabrics, but which have high burst strength.

It is also contemplated by this invention that this seam method may be used with other products and with other materials and in other fields outside the field of inflatable products.

Modifications and substitutions by one of ordinary skill in the art are considered to be within the scope of the present invention, which is not to be limited except by the allowed claims and their legal equivalents.

What is claimed is:

1. A seam forming method for use in joining a first edge and a second edge of a material to be joined together, said seam joining method comprising the acts of:
providing a first generally planar inflatable product member having a first side and a second side and a first end and a second end;
providing a second generally planar inflatable product member having a first side and a second side and a first end and a second end;
providing a first weld member having a first end and a second end;
providing a second weld member having a first end and a second end;
wherein at least a portion of said first side of said first generally planar inflatable product member proximate said first end is configured for forming a seam joint between said at least a portion of said first side proximate said first end of said at least a first generally planar inflatable product member and the first end of said first weld member, and wherein at least a portion of said first side of said first generally planar inflatable product member proximate said second end is configured for forming a seam joint between said at least a portion of said first side of said first generally planar inflatable product member proximate said second end of said first generally planar inflatable product member and the first end of said second weld member, and
wherein at least a portion of said first side of said second generally planar inflatable product member proximate said first end is configured for forming a seam joint between said at least a portion of said first side proximate said first end of said second generally planar inflatable product member and the second end of said first weld member, and wherein at least a portion of said first side of said second generally planar inflatable product member proximate said second end is configured for forming a seam joint between said at least a portion of said first side of said second generally planar inflatable product member proximate said second end and said second end of said second weld member;
providing a temporary heat sealing insulation member disposed between said first and second ends of said first weld member and said first and second ends of said second weld member;
providing a heat sealing apparatus configured for providing heat and pressure against said second side of said first generally planar inflatable product member and proximate said first and second ends of said first generally planar inflatable product member;

utilizing said heat sealing apparatus, simultaneously providing heat and pressure against said second side of said first and second generally planar inflatable product members proximate said first and second ends of said first and second generally planar inflatable product members, such that said heat sealing apparatus is configured for: sealing said first end of said first generally planar inflatable product member to said first end of said first weld member; sealing said second end of said first generally planar inflatable product member to said first end of said second weld member; sealing said first end of said second generally planar inflatable product member to said second end of said first weld member; and sealing said second end of said second generally planar inflatable product member to said second end of said second weld member; and removing said temporary heat sealing insulation member.

2. The method according to claim 1, wherein said first and second generally planar inflatable product members and said first and second weld members are made from a thermoplastic material.

3. The method according to claim 2, wherein said first and second weld members are injection molded from a thermoplastic material.

4. The method according to claim 1, wherein said temporary heat sealing insulator is made of a metal coated with a nonstick layer.

5. The method according to claim 4, wherein said metal is brass and said nonstick layer is made of polytetrafluoroethylene.

6. A seam forming method for use in joining a first edge and a second edge of material to be joined together, said seam joining method comprising the acts of:

providing at least a first generally planar inflatable product member having a first side and a second side and a first end and a second end;

providing at least a first weld member having a first end and a second end;

wherein at least a portion of said first side of said first generally planar inflatable product member proximate said first end is configured for forming a seam joint between said at least a portion of said first side proximate said first end of said at least a first generally planar inflatable product member and the first end of said first weld member, and wherein at least a portion of said first side of said at least a first generally planar inflatable product member proximate said second end is configured for forming a seam joint between said at least a portion of said first side proximate said second end of said at least a first generally planar inflatable product member and the second end of said first weld member;

providing a temporary heat sealing insulation member disposed between said first and second ends of said first weld member;

providing a heat sealing apparatus configured for providing heat and pressure against said second side of said first generally planar inflatable product member and proximate said first end of said at least a first generally planar inflatable product member;

utilizing said heat sealing apparatus, simultaneously providing heat and pressure against said second side of said at least a first generally planar inflatable product member proximate said first and second ends of said at least a first generally planar inflatable product member, such that said heat sealing apparatus is configured for sealing said first end of said at least a first generally planar inflatable product member to said first end of said first weld member and sealing said second end of said at least a first generally planar inflatable product member to said second end of said first weld member; and removing said temporary heat sealing insulation member.

* * * * *